United States Patent
Hahn et al.

(10) Patent No.: US 8,407,978 B2
(45) Date of Patent: Apr. 2, 2013

(54) METHOD FOR PRODUCING A CONTROL CHAIN

(75) Inventors: Klaus Hahn, Fuerth-Burgfarrnbach (DE); Bolko Schuseil, Adelsdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/148,781

(22) PCT Filed: Jan. 25, 2010

(86) PCT No.: PCT/EP2010/050754
§ 371 (c)(1),
(2), (4) Date: Aug. 10, 2011

(87) PCT Pub. No.: WO2010/091938
PCT Pub. Date: Aug. 19, 2010

(65) Prior Publication Data
US 2011/0308227 A1    Dec. 22, 2011

(30) Foreign Application Priority Data
Feb. 11, 2009   (DE) .......................... 10 2009 008 480

(51) Int. Cl.
*F16G 13/06* (2006.01)

(52) U.S. Cl. .................. 59/35.1; 59/8; 59/29; 29/527.4; 148/219

(58) Field of Classification Search .................... 59/4, 5, 59/6, 8, 29, 35.1; 29/527.4; 148/219
See application file for complete search history.

(56) References Cited

U.S. PATENT DOCUMENTS

| | | | |
|---|---|---|---|
| 3,136,664 A | | 6/1964 | Kuntzmann |
| 6,602,829 B1 * | | 8/2003 | Fusser ........................... 148/279 |
| 6,656,293 B2 * | | 12/2003 | Black et al. ................... 148/219 |
| 7,657,990 B2 * | | 2/2010 | Wodrich et al. .............. 29/527.4 |

FOREIGN PATENT DOCUMENTS

| | | |
|---|---|---|
| DE | 102 56 689 A1 | 11/2003 |
| EP | 0 982 515 A1 | 3/2000 |
| WO | 2005090824 A1 | 9/2005 |
| WO | 2008000210 A1 | 1/2008 |

* cited by examiner

*Primary Examiner* — David B Jones
(74) *Attorney, Agent, or Firm* — Lucas & Mercanti, LLP

(57) ABSTRACT

A method for producing pins for a control chain, which has link plates that are connected to each other by the pins. The pin ends are arranged in receiving bores arranged inside the link plates. The pin is made of steel of the type 100Cr6 or 32MnCrMo6-4-3, subjected to a carbonitriding method and has a wear zone between the 1/30 and the 1/60 part of the diameter thereof after abrasive removal on the carbonitrited pin surface.

5 Claims, 2 Drawing Sheets

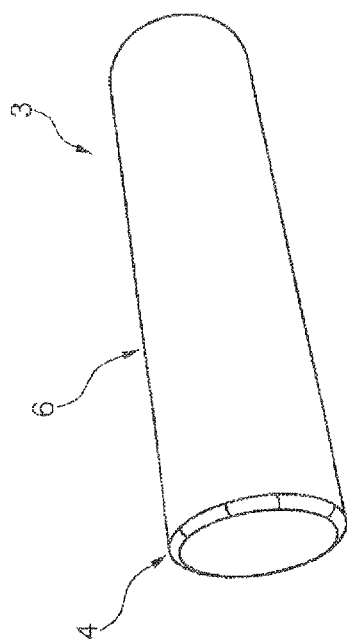
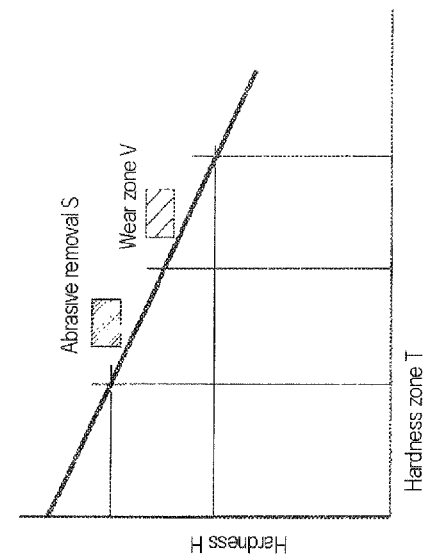
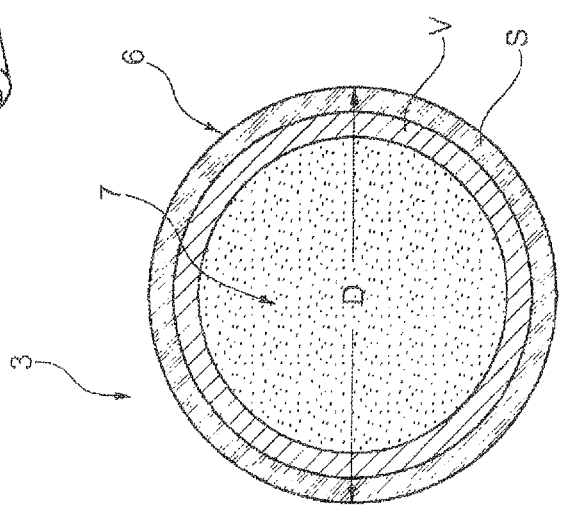

METHOD FOR PRODUCING A CONTROL CHAIN

This application is a 371 of PCT/EP2010/050754 filed Jan. 25, 2010, which in turn claims the priority of DE 10 2009 008 480.0 filed Feb. 11, 2009. The priority of both applications is hereby claimed and both applications are incorporated by reference herein.

FIELD OF THE INVENTION

The present invention relates to a method for producing a control chain comprising link plates which are connected to one another by pins.

BACKGROUND OF THE INVENTION

In order to transfer the drive forces occurring in the internal combustion engine from the drive input shaft to the drive output shaft, use is made of traction mechanisms. These traction mechanisms may be chains or belts. In the case of a chain, reference is made to a control chain which is in the form of a link chain. A link chain of the aforementioned generic type is known from DE 102 56 689 A 1. Said document describes a link chain comprising chain parts connected to one another in each case via a chain link. A link pin extends through at least one of the link openings to form a chain link. One of the support surfaces of the link opening is formed from a sintered material, whereas the link pin is produced from an alloyed steel. An edge layer of the link pin forming the support surface has a nitrified surface layer. In order to optimize the wear on the link surfaces, two different materials, namely the sintered link opening and the nitrided surface of the link pin, are operatively connected to one another. The partial sintering of the link plates at the link surface thereof is an additional and therefore costly process operation.

OBJECT OF THE INVENTION

The invention is therefore based on the object of producing a control chain with low production costs.

SUMMARY OF THE INVENTION

According to the invention, the object is achieved in that the pin produced from cost-effective steel grade 100Cr6 or 32MnCrMo6-4-3 is subjected to a carbonitriding process and in that the pin has a wear zone between the 1/30 and the 1/60 part of the diameter thereof after abrasive removal on the carbonitrided pin surface. During the carbonitriding, primarily carbon diffuses into the edge layer of the pin, with nitrogen, which accelerates the carbon diffusion, additionally being introduced.

The case-hardened steels 100Cr6 and 32MnCrMo6-4-3 each contain, depending on the steel grade, cost-effective elements such as Mn, Si and Cr, but no expensive alloying elements such as Ni and Mo or merely 0.3% thereof. In contrast, the case-hardened steels SAE 4320 or SAE3311 presently used contain about 2 or respectively 4% Ni. On account of the alloy composition, both 100Cr6 and 32MnCrMo6-4-3 are suitable for carbonitriding.

Carbonitriding is counted among the thermochemical hardening processes. In practice, it occupies the mid-position between case hardening and nitriding. The temperatures for carbonitriding are lower than for case hardening but higher than the temperatures for nitriding. The temperatures during hardening by carbonitriding in the gas are generally between 700° C. and 950° C. Whereas carbon penetrates into the steel surface during case hardening and nitrogen penetrates into the steel surface during nitriding, the effect of the carbonitriding involves the simultaneous diffusion of carbon and nitrogen. The treatment can be effected at austenitization temperature or below. $\gamma$ solid solutions of the iron are designated as the austenite. This is the main microstructural constituent of many stainless steels. The diffusion of nitrogen lowers the austenitization temperature of the edge layer. Since carbon diffuses significantly more quickly in the austenite than in the ferrite, the treatment duration in these conditions is very much shorter than during nitriding. Ferrite is the designation for crystallographic modifications of the iron; it is relatively soft and susceptible to corrosion. On account of the shorter treatment duration, the costs of the process for producing the chain pins are optimized. A further advantage is that the core region of the pin is not converted into austenite and as a result warpage scarcely occurs. This has an advantageous effect on the installation of the pin, which is subjected to tensile and compressive loading. The pin is arranged in the receiving bores of the control chain, which are arranged inside the link plates.

During carbonitriding, a bonding layer of carbonitride is formed in the outer edge layer. If the pin is quenched after the carbonitriding, a martensitic protective layer is produced underneath the bonding layer. During the subsequent abrasive process, for removing the brittle portion of the surface, it must be ensured that complete removal of the bonding layer is avoided, so that the resistance to abrasion and corrosion is retained. The parameters of the heat treatment and abrasive process are selected such that the depth of the wear zone corresponds to the 1/30 and the 1/60 part of the pin diameter.

In a preferred configuration of the invention, the pin has hardness values of between 600 HV and 900 HV in the hardness zone region after the carbonitriding.

A further possibility provides for the pin to be subjected to a nitriding process instead of a carbonitriding process, such that the wear zone after abrasive removal on the nitrided surface of the pin likewise lies between the 1/30 and the 1/60 part of the diameter thereof. The nitriding process offers an alternative to the carbonitriding process. As already mentioned, the treatment duration is increased in the case of the nitriding process, if the same depth and hardness values as in the carbonitriding process are to be achieved on the pin surface. However, it is possible in turn to reduce costs as merely nitrogen is used for the nitriding process and it is possible to dispense with carbon.

In a preferred configuration of the invention, the aforementioned control chain is used in internal combustion engines.

BRIEF DESCRIPTION OF THE DRAWINGS

Exemplary embodiments of the invention are shown in the figures described in detail below; the invention is not restricted to these exemplary embodiments.

FIG. 2 is a perspective view of a pin,

FIG. 3A is a sectional view of a pin in which the hardness profile can be seen, and FIG. 3B shows a graph plotting the hardness values H against the depth of the hardness zones T.

DETAILED DESCRIPTION OF THE INVENTION

Figure 1:
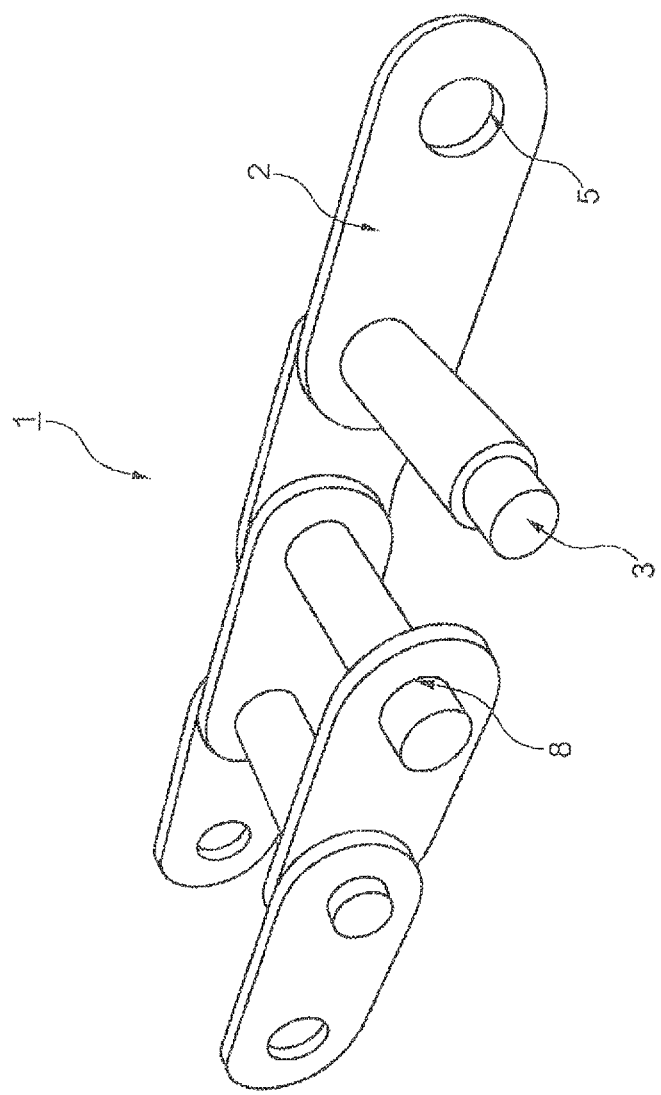
FIG. 1 is a perspective view of a control chain.

FIG. 1 shows an installed control chain 1 comprising link plates 2 which are connected to one another by means of pins 3. The pin ends 4 are arranged in receiving bores 5 arranged inside the link plates 2. The contact region between the receiving bore 5 and the pin end 4 is referred to as the link surface 8. These link surfaces 8 are worn during the circulation of the chain, e.g. during deflection of the control chain 1 around the drive wheels and also during tensioning of the control chain 1. In order to counteract this wear, the pins 3 are subjected to a hardening process.

FIG. 2 shows an individual pin 3 with a carbonitrided pin surface 6.

FIG. 3A shows the cross section through a carbonitrided pin 3. The pin 3 is hardened only on the surface 6 thereof on account of the carbonitriding process carried out. This relatively small hardness zone T, with respect to the overall pin diameter D, is formed on account of the short hardening duration which is characteristic of the carbonitriding process. This hardness zone T forms the remaining wear zone V after the abrasive removal S. Since the pin 3 is not fully hardened, a soft, axially arranged core 7 is located inside the pin. This core 7 makes it possible to absorb tensile and compressive forces from the chain drive. The depth of the wear zone V lies between the $\frac{1}{30}$ and the $\frac{1}{60}$ part of the pin diameter D.

FIG. 3B shows a graph from which it can be deduced that if the hardness zones T are reduced, as a result of the abrasive removal carried out in the production process and the wear on the link surface or pin surface 6, the hardness H decreases.

REFERENCE SYMBOLS

| | |
|---|---|
| 1 | Control Chain |
| 2 | Link Plates |
| 3 | Pin |
| 4 | Pin Ends |
| 5 | Receiving Bores |
| 6 | Pin Surface |
| 7 | Core |
| 8 | Link Surface |
| D | Diameter |
| H | Hardness |
| S | Abrasive Removal |
| T | Hardness Zone |
| V | Wear Zone |

The invention claimed is:

1. A method for producing pins with pin ends for a control having link plates with receiving bores extending from an inside surface of the link plates, the link plates being connected to one another by the pins such that the pin ends are arranged in the receiving bores, the method comprising the steps of:
producing the pins from steel of grade 100Cr6 or 32MnCrMo6-4-3;
subjecting the pins to a carbonitriding process; and
abrasively removing material from a surface of the pins which has been carbonitrided at the pin ends so as to form a wear zone between $\frac{1}{30}$ and $\frac{1}{60}$ of a diameter of the pins at the pin ends.

2. The method for producing a control chain as claimed in claim 1, wherein, the pin has a hardness zone region having a hardness of between 600 HV and 900 HV after the pin surface has been carbonitrided.

3. The method for producing a control chain as claimed in claim 1, wherein the control chain is designed for an internal combustion engine.

4. A method for producing pins with pin ends for a control having link plates with receiving bores extending from an inside surface of the link plates, the link plates being connected to one another by the pins such that the pin ends are arranged in the receiving bores, the method comprising the steps of:
producing the pins from steel of grade 100Cr6;
subjecting the pins to a nitriding process; and
abrasively removing material from a surface of the pins which has been nitrided at the pin ends so as to form a wear zone between $\frac{1}{30}$ and $\frac{1}{60}$ of a diameter of the pins at the pin ends.

5. The method for producing a control chain as claimed in claim 4, wherein the control chain is designed for an internal combustion engine.

* * * * *